United States Patent
Taylor (10) Patent No.: US 9,644,668 B2
(45) Date of Patent: May 9, 2017

(54) FASTENER

(71) Applicant: Wamlez Pty Ltd, Pacific Pines (AU)

(72) Inventor: Warren Taylor, Pacific Pines (AU)

(73) Assignee: WAMLEZ PTY LTD., Pacific Pines, QLD (AU)

(*) Notice: Subject to any disclaimer, the term of this patent is extended or adjusted under 35 U.S.C. 154(b) by 197 days.

(21) Appl. No.: 14/444,808

(22) Filed: Jul. 28, 2014

(65) Prior Publication Data

US 2014/0334898 A1  Nov. 13, 2014

Related U.S. Application Data (63) Continuation-in-part of application No. 13/418,662, filed on Mar. 13, 2012, now abandoned.

(30) Foreign Application Priority Data

Mar. 28, 2011 (AU) ............................... 2011901131

(51) Int. Cl.
F16B 35/04 (2006.01)
F16B 39/30 (2006.01)
F16B 25/00 (2006.01)
F16B 35/06 (2006.01)

(52) U.S. Cl.
CPC .......... *F16B 39/30* (2013.01); *F16B 25/0021* (2013.01); *F16B 25/0057* (2013.01); *F16B 35/06* (2013.01)

(58) Field of Classification Search
CPC .......... F16B 19/05; F16B 39/30; F16B 35/06; F16B 25/0027; F16B 25/0073; F16B 25/0021; F16B 25/0031; Y10T 29/49966
See application file for complete search history.

(56) References Cited

U.S. PATENT DOCUMENTS

| | | | |
|---|---|---|---|
| 1,190,069 A | 7/1916 | Abernethy | |
| 2,292,557 A | 8/1942 | Wilson | |
| 2,419,555 A | 4/1947 | Fator | |
| 3,124,408 A * | 3/1964 | Oestereicher | F16B 25/0021 411/183 |
| 3,322,019 A | 5/1967 | Lovisek | |
| 3,389,734 A | 6/1968 | Gutshall | |
| 3,861,269 A * | 1/1975 | Laverty | F16B 25/0031 411/413 |

(Continued)

FOREIGN PATENT DOCUMENTS

| | | |
|---|---|---|
| AU | 2012201502 | 10/2012 |
| FR | 2713291 | 6/1995 |

OTHER PUBLICATIONS

The Commissioner of Patents, "Statement of Grounds and Particulars," Apr. 30, 2015, Australia, pp. 1-51, Ref. 516200.

*Primary Examiner* — Gary Estremsky
(74) *Attorney, Agent, or Firm* — Kirton McConkie; Evan R. Witt (57) ABSTRACT

A fastener for locking two or more sheet sections together comprises a shaft tapered at one end and having a driving head at the other end with a relatively coarse thread running from the tapered end towards the head and a relatively fine thread between the coarse thread and the head. The fine thread has a pitch which is approximately equal to the thickness of the sheet sections and extends from the head for from two to six threads.

13 Claims, 7 Drawing Sheets

(56) References Cited

U.S. PATENT DOCUMENTS

| | | | |
|---|---|---|---|
| 4,705,441 A * | 11/1987 | Arnold | F16B 39/282 |
| | | | 411/188 |
| 4,820,235 A | 4/1989 | Weber et al. | |
| 4,844,676 A * | 7/1989 | Adamek | F16B 25/0021 |
| | | | 411/386 |
| 4,959,938 A | 10/1990 | De Caro | |
| 5,259,398 A * | 11/1993 | Vrespa | A61B 17/863 |
| | | | 128/898 |
| 5,433,570 A | 7/1995 | Koppel | |
| 5,536,127 A | 7/1996 | Pennig | |
| 5,779,417 A * | 7/1998 | Barth | F16B 25/0021 |
| | | | 411/399 |
| 6,000,892 A | 12/1999 | Takasaki | |
| 6,030,162 A * | 2/2000 | Huebner | A61B 17/1682 |
| | | | 411/263 |
| 6,045,312 A * | 4/2000 | Hsing | F16B 25/0021 |
| | | | 411/399 |
| 6,666,638 B2 | 12/2003 | Craven | |
| 6,854,942 B1 * | 2/2005 | Hargis | F16B 25/0031 |
| | | | 411/369 |
| 6,989,014 B2 | 1/2006 | Justin et al. | |
| 7,153,075 B2 | 12/2006 | Sommer et al. | |
| 7,367,768 B2 | 5/2008 | McGovern et al. | |
| 2003/0059277 A1 | 3/2003 | O'Berry | |
| 2006/0229622 A1 | 10/2006 | Huebner et al. | |
| 2007/0147974 A1 | 6/2007 | McGovern et al. | |
| 2008/0031705 A1 | 2/2008 | Severns | |

* cited by examiner

FASTENER

CROSS REFERENCE TO RELATED APPLICATIONS

This application is a continuation-in-part application of U.S. patent application Ser. No. 13/418,662 filed on Mar. 13, 2012 now pending and incorporated by reference herein.

FIELD OF THE INVENTION

This invention relates generally to fasteners and in particular to screws for securing metal sheets and rolled metal products used in the construction of steel frame systems.

BACKGROUND OF THE INVENTION

In metal fabrication it is often necessary to fasten adjacent sheets of metal such as the webs of steel purlins or the overlapping junction of two cladding sheets in a steel frame system. Typically fine threaded screws of constant pitch and gauge are used since a fine thread is required to draw the two sections together tightly when the screw is fully wound into the aligned guide holes drilled in the two sections.

A course threaded screw would not bring the sections closely together since the coarse thread allows separation of the sections even in the fully tightened configuration. In fact the pitch of the thread required to bring the sections together tightly is approximately equal to the thickness of the sections.

However a fine threaded screw requires many rotations to achieve full insertion, in fact one rotation for each of the threads of the screw. Further since the guide holes have a diameter somewhat less than the screw, the guide holes need to be in close alignment for insertion to start and considerable driving force is required to complete insertion. Accordingly the fastening of metal sections using such fine threaded screws is problematic and time consuming.

Clearly it would be advantageous to provide a fastener for securing metal sheets in a steel frame system which is easy to insert in guide holes and fast to drive, or at least provides an alternative to existing fasteners.

STATEMENT OF THE INVENTION

In accordance with a first aspect, the present invention provides a fastener for locking two or more sheet sections together comprising: a shaft tapered at one end and having a driving head at the other end with a relatively coarse thread running from the tapered end towards the head and a relatively fine thread between the coarse thread and the head, wherein the fine thread has a pitch which is adapted to be approximately equal to the thickness of the sheet sections and includes a first fine thread adjacent the driving head and one or more additional fine threads such that, when the fastener is fully inserted through the two or more sheet sections, the two or more sheet sections are tightly secured between the driving head and the fine threads.

Preferably, the coarse thread may extend from the tapered end for from two to seven threads and has a pitch from two to five times the pitch of the fine thread.

Preferably, the tapered end may be adapted to form a self-drilling screw. The driving head may be used to turn the screw and is any suitable head such as a recessed cross-slot head, a hexagonal head or any security or anti-tamper type screw head. The fastener may further comprise serrations disposed on an underside of the head adjacent to the relatively fine thread. Preferably, the gauge of the fine threads is greater than the gauge of the coarse threads and the diameter of the shaft of the fine thread is greater than the diameter of the shaft of the coarse thread.

In accordance with a further aspect, the present invention provides a fastener for locking two or more sheet sections together comprising: a shaft tapered at one end and having a driving head at the other end; a relatively fine thread between the coarse thread and the head; a relatively coarse thread running from the tapered end towards the head in which the coarse thread extends from the tapered end for from two to seven threads and has a pitch from two to five times the pitch of the fine thread; and wherein a relatively fine thread between the coarse thread and the head in which the fine thread has a pitch which is adapted to be approximately equal to the thickness of a sheet section and includes a first fine thread that extends from the head and two or more additional fine threads such that, when the fastener is fully inserted through the two or more sheet sections, the two or more sheets sections are tightly secured between the driving head and the fine threads.

Preferably, the tapered end may be adapted to form a self-drilling screw. The driving head may be used to turn the screw and is any suitable head such as a recessed cross-slot head, a hexagonal head or any security or anti-tamper type screw head. Preferably, the fastener may further comprise serrations disposed on an underside of the head adjacent to the relatively fine thread, wherein the serrations are angled to inhibit unscrewing movement of the screw. Preferably, the gauge of the fine threads may be greater than the gauge of the coarse threads and the diameter of the shaft of the fine thread is greater than the diameter of the shaft of the coarse thread.

In accordance with a still further aspect, the present invention provides a fastener for locking two sheet sections together comprising: a shaft tapered at one end and having a driving head at the other end; a section of coarse threads at the tapered end of the shaft, the coarse threads having a pitch that is greater than the thickness of the two sheet sections so that the section of coarse threads can quickly pass through the two sheet sections; a section of fine threads that extends from the section of coarse threads to the driving head including a top fine thread adjacent the driving head, the fine threads having a pitch that is substantially equal to the thickness of the two sheet sections so that when the section of fine threads has passed through the two sheet sections, the two sheet sections remain tightly secured between the driving head and the fine threads.

Preferably, serrations disposed on an underside of the driving head so that the two sheet sections may be secured between the annular serrations and the fine threads. Preferably, the gauge of the fine threads may be greater than the gauge of the coarse threads and the diameter of the shaft of the fine thread is greater than the diameter of the shaft of the coarse thread.

Preferably, the two sheet sections may be cladding sheets. Alternatively, the two sheet sections may be steel purlins.

Preferably, the section of coarse threads may comprise seven coarse threads. The section of fine threads may comprise seven fine threads. The pitch of the coarse threads may be two times greater than the pitch of the fine threads. Alternatively, the pitch of the coarse threads may be three times greater than the pitch of the fine threads. Further alternatively the pitch of the coarse threads may be four times greater than the pitch of the fine threads. Still further alternatively, the pitch of the coarse threads may be five times greater than the pitch of the fine threads.

In accordance with a still further aspect, the present invention provides a fastener for locking two sheet sections together comprising: a shaft tapered at one end and having a driving head at the other end; a section of coarse threads at the tapered end of the shaft, the coarse threads having a pitch that is greater than the thickness of the two sheet sections so that the section of coarse threads can quickly pass through the two sheet sections; a section of fine threads that extends from the section of coarse threads to the driving head including a top fine thread adjacent the driving head, the fine threads having a pitch that is substantially equal to the thickness of the two sheet sections so that when the section of fine threads has passed through the two sheet sections, the two sheet sections remain tightly secured between the driving head and the top fine thread.

Preferably, serrations disposed on an underside of the driving head so that the two sheet sections may be secured between the annular serrations and the top fine threads. The gauge of the fine threads may be greater than the gauge of the coarse threads and the diameter of the shaft of the fine thread is greater than the diameter of the shaft of the coarse thread.

BRIEF DESCRIPTION OF THE DRAWINGS

An embodiment of the invention is now described by way of example only with reference to the accompanying drawing in which.

DETAILED DESCRIPTION OF THE INVENTION

Figure 1:
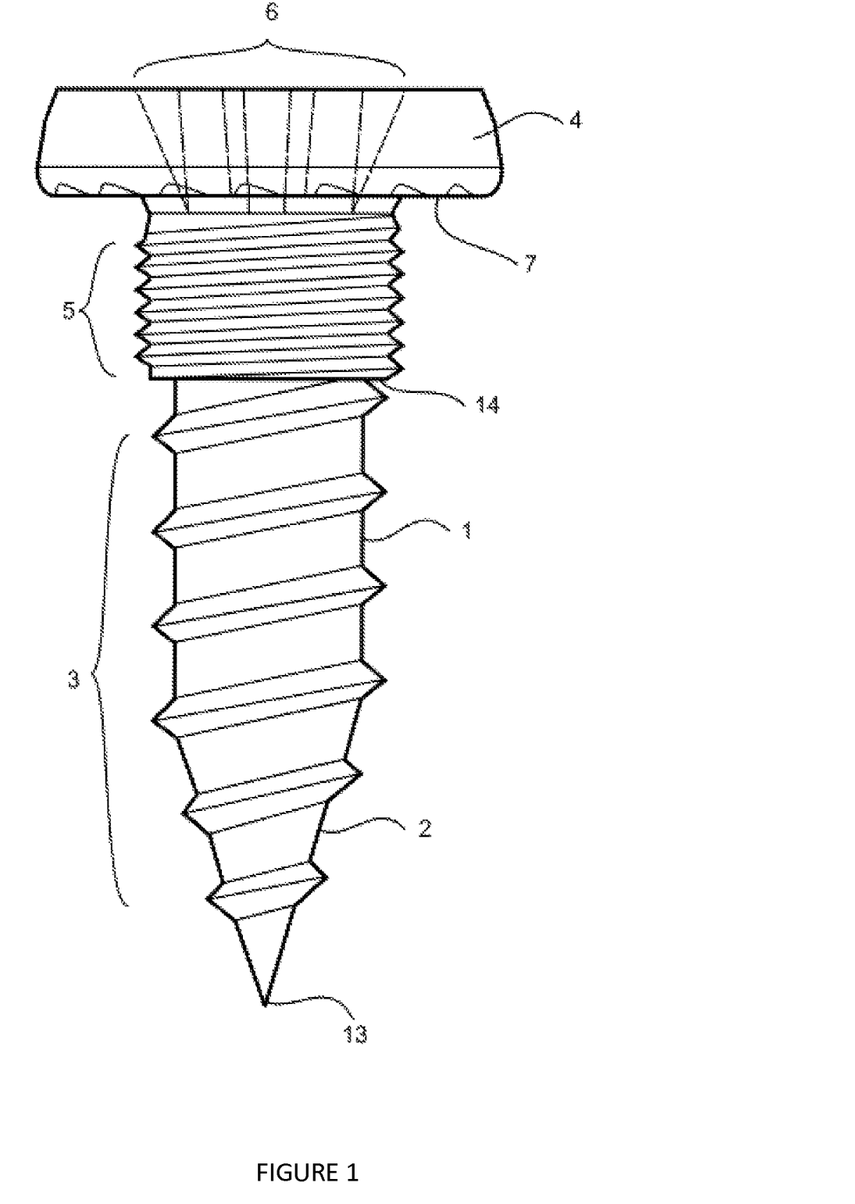
FIG. 1 is a side view of a screw for fastening metal sheets in accordance with the present invention.
Figure 7:
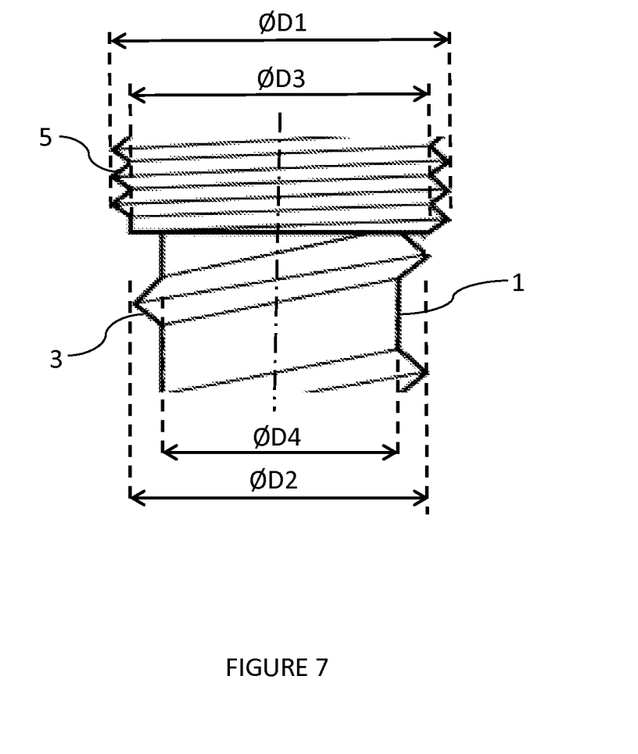
FIG. 7 shows a partial exploded view of both the fine and coarse threads in accordance with an embodiment of the present invention.

In FIG. 1 a steel screw for fastening metal sheets has shaft 1 with tapered tip 2 and an end 13, the screw also has coarse starting threads 3 starting on the tapered section 2 and progressing along the shaft 1 to a point 14. The point 14 is located on the shaft 1 between the upper section of shaft 1 between coarse threads 3 and screw head 4 and the much finer threads 5. The gauge of a screw is determined by the basic size of the thread outside diameter. As shown in FIG. 7 in this case the gauge of the fine thread 5 is larger or the diameter D1 is greater in size than the diameter D2 of the coarse thread 3. Likewise, the diameter D3 of the shaft 1 of the fine thread 5 is greater than the diameter D4 of the shaft 1 of the coarse thread 3.

The difference in the diameter of the shaft of the two threads 3, 5 in particular D3 being greater than D4 plays a critical part in the reduction in time taken to fasten at least two sheets of metal 12 together and also a reduction in the force applied to the driver to fasten the sheets 12 together. When used with pre-drilled or punched holes the smaller diameter D4 (coarse thread 5) allows the two sheets of metal 12 to be easily centred prior to engaging with the fine thread 3 to securely fasten the two sheets 12 together. This also means less damage or at least the punched or pre-drilled holes are left in better condition.

Figure 2:
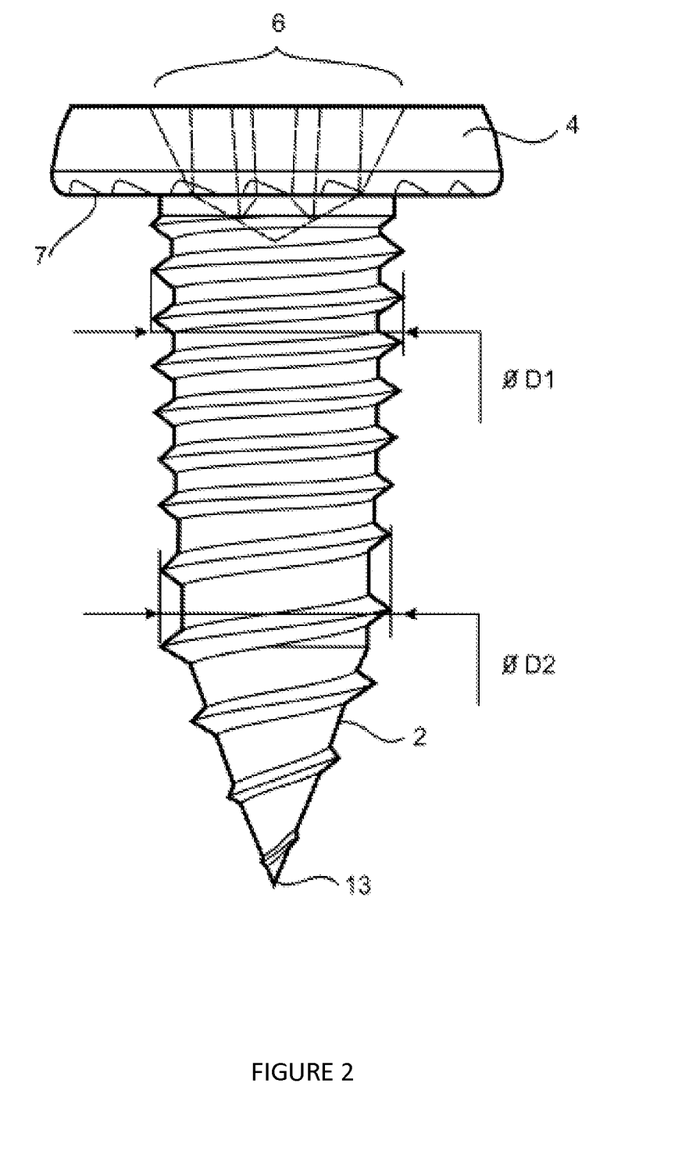
FIG. 2 shows a side view of a screw according to a further embodiment of the present invention.

The pitch of threads 5 is approximately equal to the thickness of a metal sheet 12 to be fastened and there are seven threads 5. As the skilled addressee would know there are a number of options for the pitch of threads as well as the number of threads in any given screw. As such the thread pitch is taken as the distance between threads expressed in millimeters (measured along the length of the fastener). The present invention has both a coarse thread 3 and a fine thread 5 therefore having two thread pitches extending along the screw. As shown in FIGS. 1 and 2 the steel screw for fastening metal sheets has shaft 1 with tapered tip 2 and coarse starting threads 3. The upper section of shaft 1 between coarse threads 3 and screw head 4 has much finer threads 5.

Figure 3:
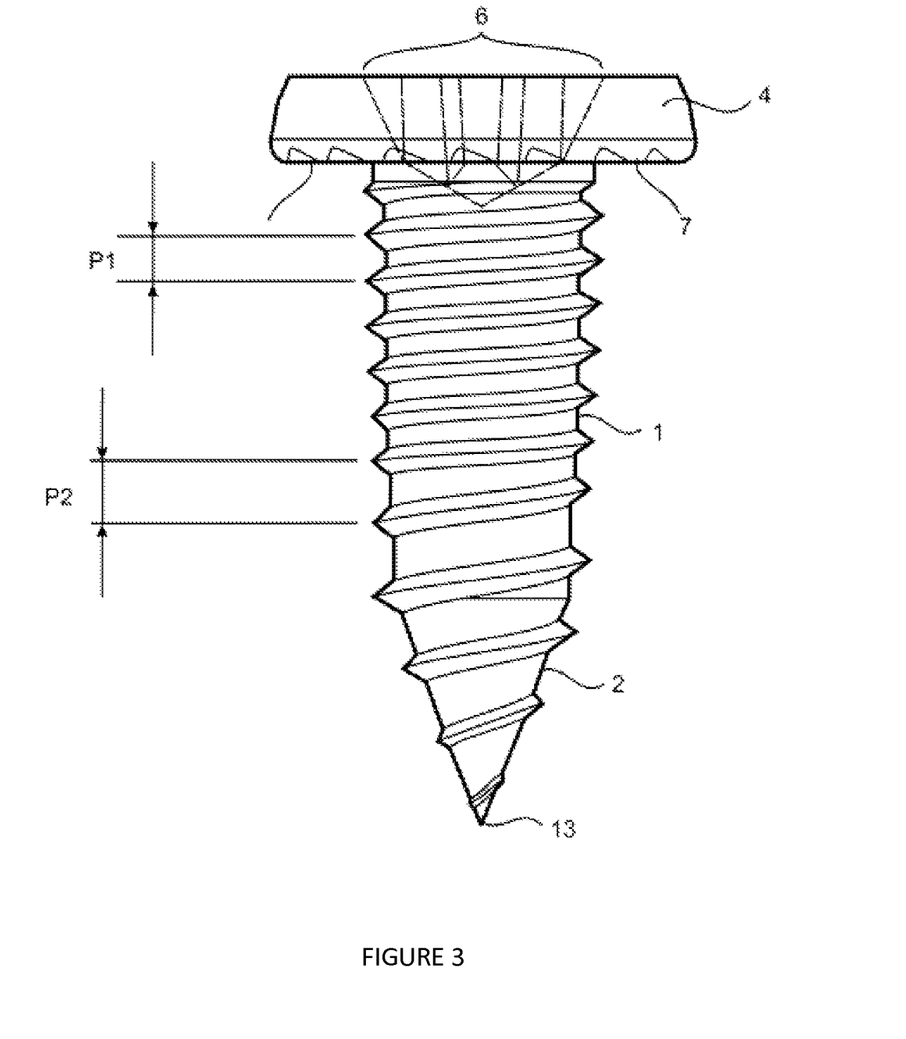
FIG. 3 shows a further side view of the screw of FIG. 2.

By way of example only, a thread pitch of 1.5 means that the distance between one thread and the next is 1.5 mm. As shown in FIG. 1 the present invention has a coarse thread 3 which has a thread pitch approximately five times greater than the pitch of the fine threads 5. Alternatively and as illustrated in FIGS. 2 and 3 the screw has a coarse thread 3 which has a thread pitch approximately 1.5 times greater than the pitch of the fine threads 5. Alternatively the screw may have a coarse thread 3 which has a pitch three times greater than the pitch of the fine threads 5 or the pitch of the coarse threads 3 is four times greater than the pitch of the fine threads 5.

Head 4 has recessed slots 6 to receive a Phillips or cross-slot head driver. As the skilled addressee would know there are a number of options for the shape and design of the head 4 and the type of recessed slots 6 for use with a variety of different drive heads.

The head 4 also has an underside which has a number of annular serrations 7. The serrations 7 are formed into the bearing surface on the underside of the head 4 of the screw and may be slotted or un-slotted. The serration 7 geometry is oriented to resist loosening and also aids in slowing the screw at the point of engagement with the mating piece of sheet metal 12 so as to minimize stripping.

Figure 4:
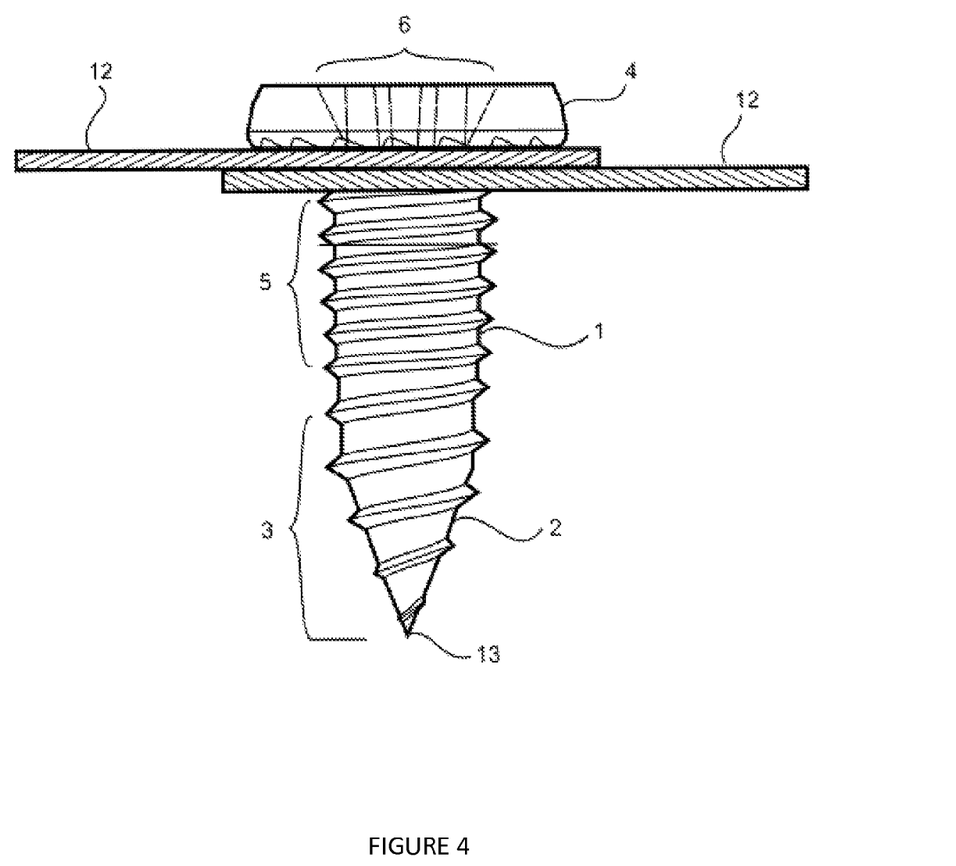
FIG. 4 illustrates the screw of FIG. 2 in use fastening two metal sheets in accordance with the present invention.
Figure 6:
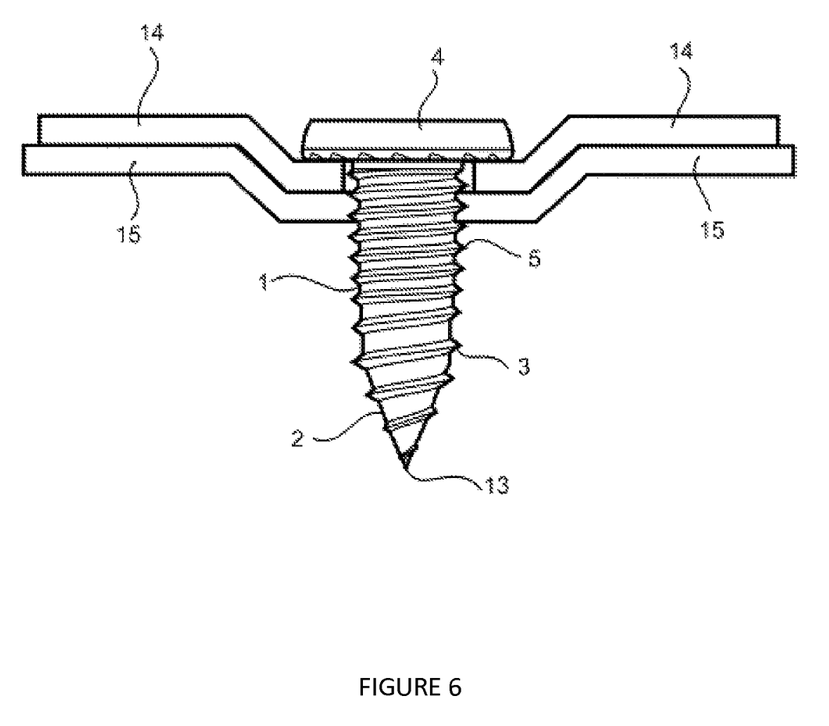
FIG. 6 illustrates the screw of FIG. 2 in use fastening two metal sheets in accordance with the present invention.

Referring to FIG. 4 and FIG. 6, each shows the fastener in use holding two metal sections. In FIG. 4 the two metal sections have a thickness substantially equal to the pitch of the fine threads whereas in FIG. 6 each of the metal sections has a thickness substantially equal to the pitch of the fine threads. Accordingly in use and as illustrated in FIGS. 4 and 6 tapered tip 2 is inserted into the guide holes in the metal sections 12 to be secured and head 4 is rotated by a driving tool with a Phillips head driver (not shown). The guide holes are typically pre-drilled in the metal sheets 12 and the coarse thread 3 is designed to assist in the alignment of the holes in the metal sheets 12. Coarse threads 3 causes shaft 1 to travel quickly through the metal sections up to the start of fine threads 5 in just six rotations corresponding to six coarse threads 3.

At this point the metal sections 12 are firmly held and the guide holes are closely aligned to receive fine threads 5. A further six rotations of shaft 1 result in complete insertion of the screw with the metal sections 12 clamped firmly together between annular serrations 7 and the uppermost of fine threads 5. The screw of this embodiment has been designed to also reduce friction between the screw and the metal sheets 12 during securing of the sheets and screws. In order to reduce the friction the diameter D4 of the coarse thread shaft 1 is less than the diameter D3 of the fine thread shaft 1. Accordingly complete insertion of the screw is achieved in 12 rotations. A similar fine threaded screw requires at least 24 rotations and the initial insertion of the fine threaded tip in the undersized guide holes is problematic.

FIG. 6 illustrates the use of the screw to fasten two sheets or pieces of metal 14, 15 which have pre-drilled holes. The sheets of metal 14, 15 are not flat pieces of metal and have dimples which allow the head 4 of the screw to have a flush finish. This is particularly important for the securing of a stud plate and noggin in a steel frame system. The recess which the screw head 4 is seated allows the flush mounting of cladding to the steel frame system.

This figure also illustrates the difference in thickness of the sheets of metal. The sheets 14, 15 are firmly held and the guide holes are closely aligned to receive fine threads 5. The sheets 14, 15 are held tightly between three fine threads 5 and the underside of the screw head 4.

As illustrated in FIGS. 4 and 6 the number sheets of metal to be fastened has been illustrated as two sheets 12 or 14, 15. However a skilled addressee would easily understand that multiple sheets of metal could be fastened and secured between the underside of the head 4 and the fine threads 5. Therefore the present invention is not limited to securing only two sheets of metal, and could be used to secure three sheets or sheets of varying thicknesses.

Figure 5:
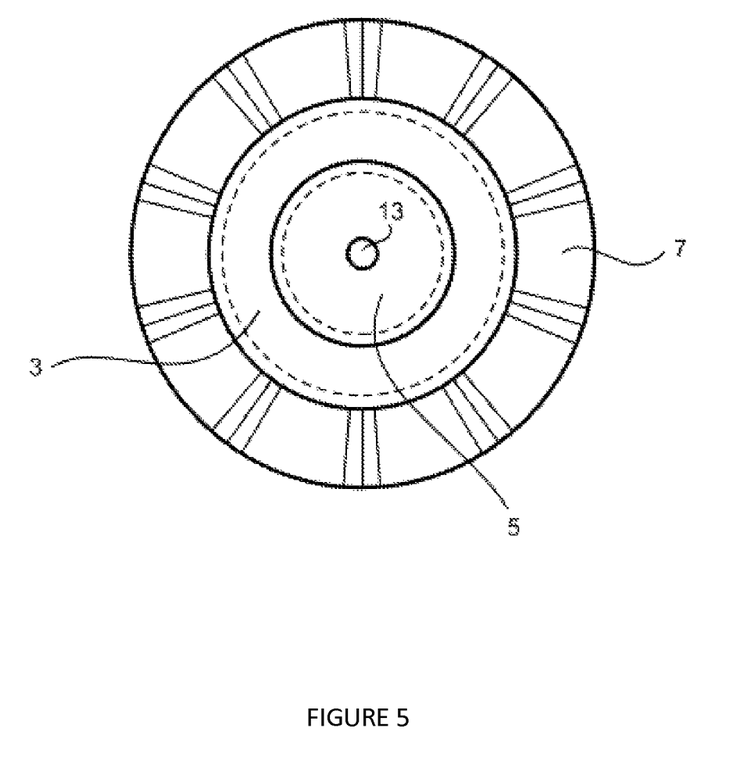
FIG. 5 shows a bottom view of the screw of FIG. 2.

FIG. 5 illustrates the underside of the screw as viewed from the bottom end of the screw or from the point 13. FIG. 6 clearly shows the two sets of thread 3, 5 having two different diameters or gauge and the serrations 7 located on the underside of the screw head 4.

Advantages

It will be obvious that the screw of the present invention with coarse starting threads and fine securing threads can be fully inserted to secure metal sections far more quickly and reliably than a screw with a constant fine pitch. There is also less steel required for the former since the coarse thread section has a reduced shaft diameter.

One of the advantages of the present invention is the design of the two separate threads. A first coarse thread located at the tapered shaft end which the combination of the shaft and coarse thread has a smaller diameter than the combination of the fine thread and shaft as shown in FIG. 1. This was to aid in the quick insertion of the screw and to ensure that the hole in the two or more sheets is centered on the fine thread which locks the sheets together.

The diameters or gauge of the two threads are critical in playing there part in reducing construction time (approximately 30%), power tool energy in fastening the metal sheets of steel frame/purlin/sheets together. The present invention also has other advantages such as to reduce material in production of the screw or fastener which will also reduce the cost to produce the screw and being based on both the volume, less material is used. Also during construction of the steel frame system having the diameter D4 less than the diameter D3 reduces the amount of friction when fastening two or more metal sheets together. The head & point can vary given the application, a blunt point tip may provide similar time reduction—the cost of production increases for the 10-15 pcs pulling in the second sheet into the application. There is also the added advantage of a weight reduction in the overall product being transported.

Likewise other advantages such as the reduction of energy or force and time used when in application, increase production cycles, lessening production costs. The pre-drilled/punched holes are left in better condition when bringing them into alignment The present invention also provides the ability to customize the two thread gauges P1 and P2 to provide the functionality speed relative to different thicknesses of metal—0.55, 0.75 & 0.95 mm Variations It will be realized that the foregoing has been given by way of illustrative example only and that all other modifications and variations as would be apparent to persons skilled in the art including mechanical equivalents are deemed to fall within the broad scope and ambit of the invention as herein set forth. For example, the fasteners could be made with self tapping shaft tips and hexagonal or other heads to receive matching drivers. Further the fastener could be made from materials other than steel and modified to secure nonmetal sections but still using the basic principle of coarse starter threads and finer securing threads.

Throughout the description and claims the words sheet(s), metal sheet(s), steel frames, purlins, rolled or pressed metal, all types of cladding and other variations have been used to describe the sheet or sheets which the fastener is used to secure tightly. It should be obvious to a skilled person that any number of variations can be used to describe the metal sheet or sheet section and therefore should not be excluded from the scope of the present invention.

Throughout the description and claims of this specification the words "comprise" and variations of that word such as "comprises" and "comprising" are not intended to exclude other additives components integers or steps.

The invention claimed is:

1. A fastener locking two or more sheet sections together comprising:
    a shaft tapered at one end and having a driving head at another end;
    a section of coarse threads running from the tapered end of the shaft towards the driving head, the coarse threads having a pitch that is greater than a thickness of a sheet section so that the section of coarse threads can quickly pass through the sheet sections;
    a section of fine threads that extends from the section of coarse threads to the driving head including an uppermost fine thread adjacent the driving head, the fine threads having a pitch which is adapted to be substantially equal to the thickness of at least one of the sheet sections so that when the section of fine threads has passed through the two sheet sections, the two sheet sections remain tightly secured between the driving head and the uppermost fine threads;
    wherein the section of coarse threads and the section of fine threads form a substantially continuous thread along the full length of the shaft to the driving head and a major diameter of the section of fine threads is greater than a major diameter of the section of coarse threads throughout the length of the shaft;
    wherein the gauge of the fine threads is greater than the gauge of the coarse threads;
    wherein the diameter of the shaft under the fine threads is greater than the diameter of the shaft under the coarse threads; and
    wherein the pitch of the coarse threads is at least three times greater than the pitch of the fine threads.

2. The fastener of claim 1 wherein the tapered end is adapted to form a self-drilling screw.

3. The fastener of claim 1 in which the driving head is used to turn the screw and is any suitable head such as a recessed cross-slot head, a hexagonal head or any security or anti-tamper type screw head.

4. The fastener of claim 1 further comprising serrations disposed on an underside of the driving head adjacent to the uppermost fine threads.

5. The fastener of claim 4 wherein the serrations are angled to inhibit unscrewing movement of the screw.

6. The fastener of claim 1, wherein the section of coarse threads comprises seven coarse threads.

7. The fastener of claim 1, wherein the section of fine threads comprises seven fine threads.

8. The fastener of claim 1, wherein the pitch of the coarse threads is four times greater than the pitch of the fine threads.

9. The fastener of claim 1, wherein the pitch of the coarse threads is five times greater than the pitch of the fine threads.

10. In combination, two or more sheet sections and a fastener locking the two or more sheet sections together the fastener comprising:

a shaft tapered at one end and having a driving head at another end with a section of coarse threads running from the tapered end towards the driving head and a section of fine threads between the section of coarse threads and the driving head;

wherein the section of coarse threads and the section of fine threads form a substantially continuous thread along the full length of the shaft to the driving head;

wherein the section of fine threads have a pitch which is approximately equal to the thickness of at least one of the two or more sheet sections and includes uppermost fine threads adjacent the driving head; and wherein a major diameter of the section of fine threads is greater than a major diameter of the section of coarse threads throughout the length of the shaft such that, when the fastener is fully inserted through the two or more sheet sections, the two or more sheet sections are tightly secured between the driving head and the uppermost fine threads.

11. The fastener of claim 10, wherein the two sheet sections are cladding sheets.

12. The fastener of claim 10, wherein the two sheet sections are steel purlins.

13. The combination of claim 10 wherein the diameter of the shaft under the fine thread is greater than the diameter of the shaft under the coarse thread.

* * * * *